United States Patent
Cho et al.

(10) Patent No.: US 9,503,557 B2
(45) Date of Patent: Nov. 22, 2016

(54) MOBILE TERMINAL AND CONTROLLING METHOD THEREOF

(71) Applicant: LG ELECTRONICS INC., Seoul (KR)

(72) Inventors: Mijin Cho, Seoul (KR); Jihye Yu, Seoul (KR); Hannah Na, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 14/590,647

(22) Filed: Jan. 6, 2015

(65) Prior Publication Data

US 2015/0201058 A1    Jul. 16, 2015

(30) Foreign Application Priority Data

Jan. 16, 2014  (KR) ................. 10-2014-0005748

(51) Int. Cl.
  *H04M 1/65* (2006.01)
  *H04M 1/725* (2006.01)
  *H04M 1/23* (2006.01)

(52) U.S. Cl.
  CPC ......... *H04M 1/72522* (2013.01); *H04M 1/236* (2013.01); *H04M 1/72566* (2013.01); *H04M 1/72572* (2013.01); *H04M 1/72583* (2013.01); *H04M 2250/68* (2013.01)

(58) Field of Classification Search
  CPC ........... H04M 1/236; H04M 1/72522; H04M 1/72566; H04M 1/72572; H04M 1/72583; H04M 68/225
  See application file for complete search history.

(56) References Cited

U.S. PATENT DOCUMENTS

| | | | |
|---|---|---|---|
| 2010/0222079 A1* | 9/2010 | Lee | G01C 21/343 455/456.3 |
| 2011/0066640 A1* | 3/2011 | Kim | H04L 29/12132 707/769 |
| 2014/0304655 A1* | 10/2014 | Imoto | G06F 3/04842 715/823 |
| 2015/0077358 A1* | 3/2015 | Wang | G06K 9/222 345/173 |

* cited by examiner

*Primary Examiner* — Kenneth Lam
(74) *Attorney, Agent, or Firm* — Lee, Hong, Degerman, Kang & Waimey

(57) ABSTRACT

A mobile terminal and controlling method thereof are disclosed, by which a meaningful information can be extracted during a call. The present invention includes a display unit, a wireless communication unit configured to perform a call, a microphone configured to receive a user voice during the call, an audio output unit configured to output a counterpart voice received through the wireless communication unit during the call, and a controller configured to convert at least one of the user voice or the counterpart voice to a text, extract specific information from the converted text, and, if the call ends, control the extracted specific information to be displayed through the display unit.

20 Claims, 22 Drawing Sheets

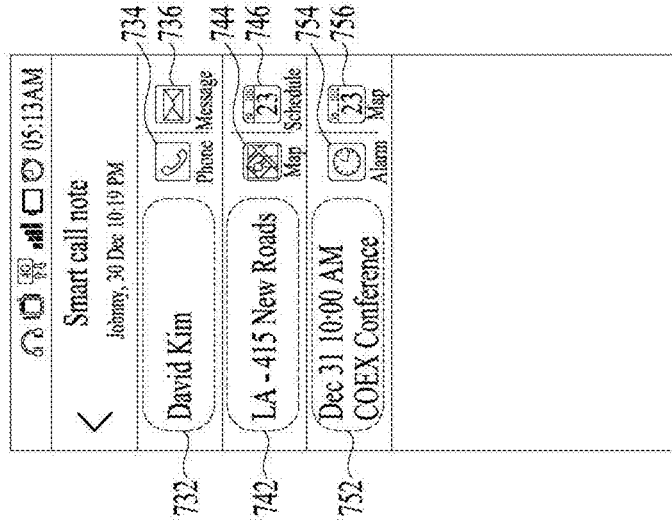
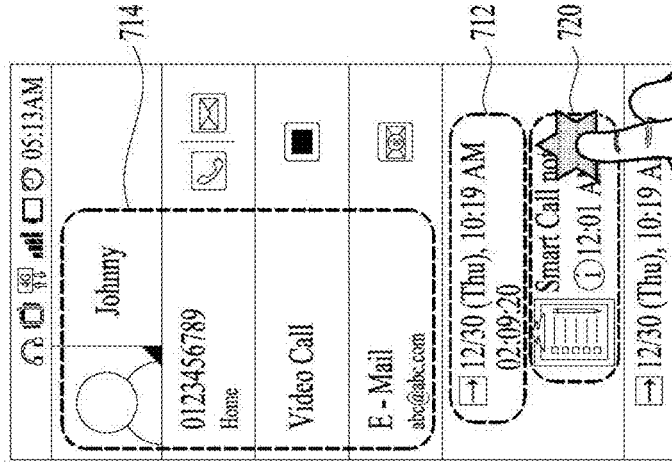
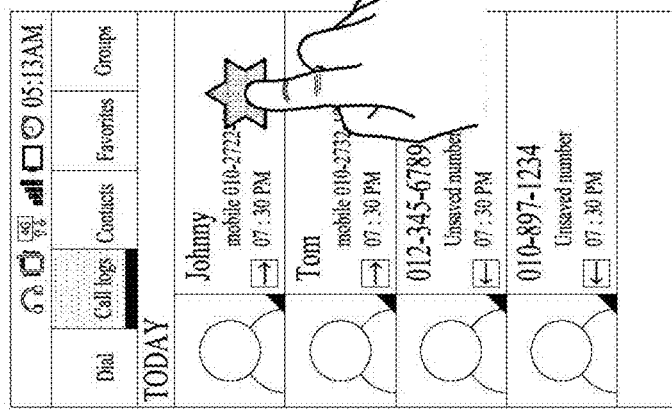

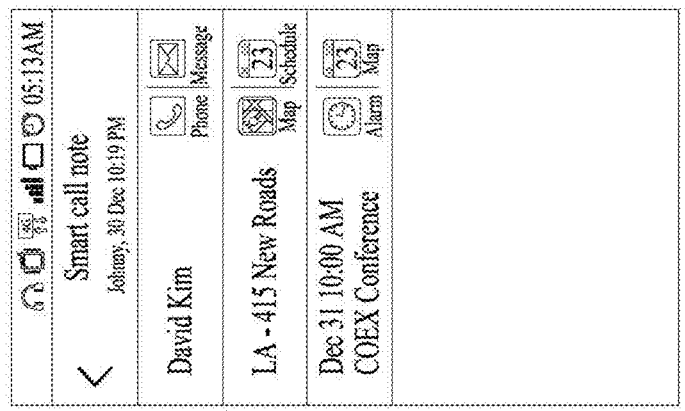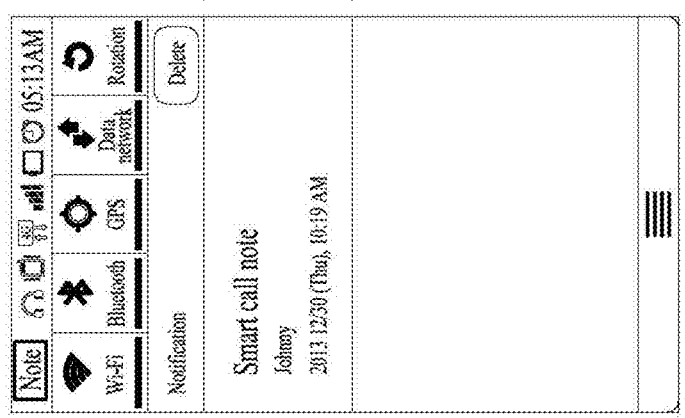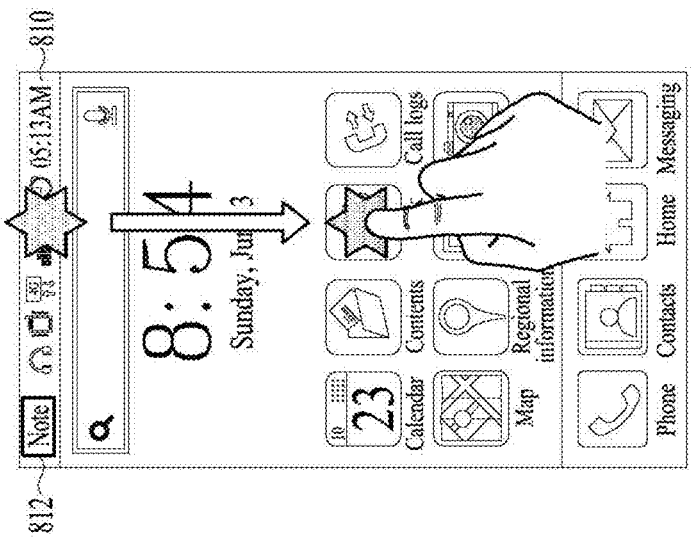

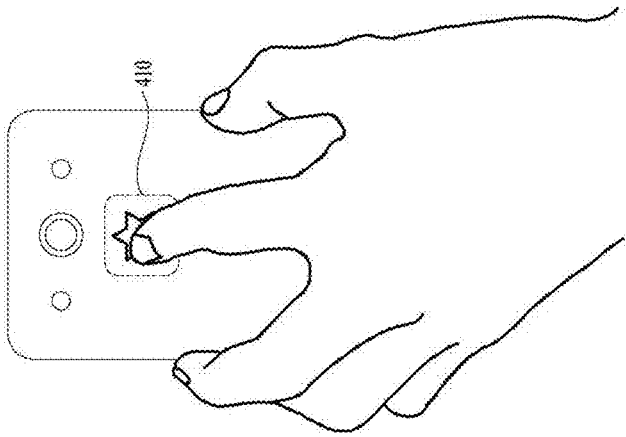

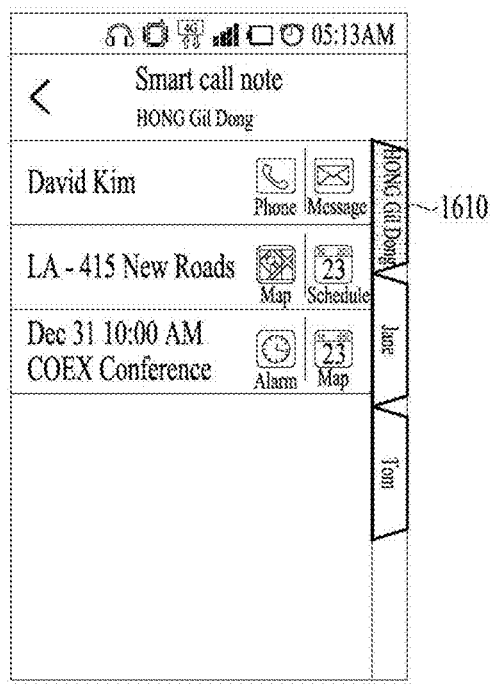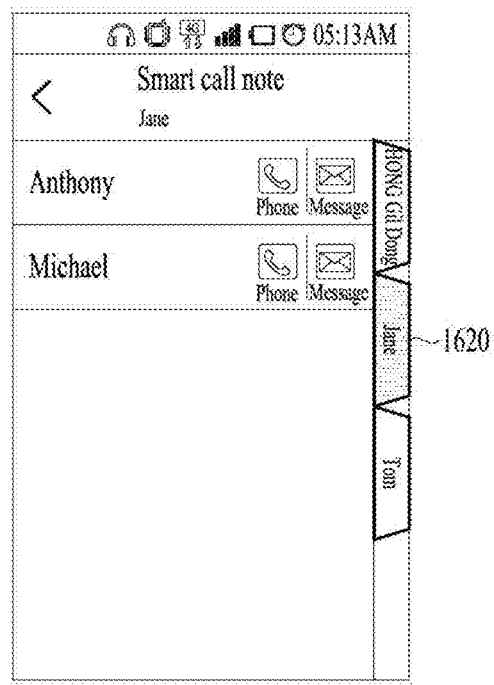

MOBILE TERMINAL AND CONTROLLING METHOD THEREOF

CROSS-REFERENCE TO RELATED APPLICATIONS

Pursuant to 35 U.S.C. §119(a), this application claims the benefit of earlier filing date and right of priority to Korean Application No. 10-2014-0005748, filed on Jan. 16, 2014, the contents of which are hereby incorporated by reference herein in its entirety.

BACKGROUND OF THE INVENTION

Field of the Invention

The present invention relates to a mobile terminal, and more particularly, to a mobile terminal and controlling method thereof. Although the present invention is suitable for a wide scope of applications, it is particularly suitable for extracting meaningful information while talking over the mobile terminal.

Discussion of the Related Art

A mobile terminal is a device which may be configured to perform various functions. Examples of such functions include data and voice communications, capturing images and video via a camera, recording audio, playing music files and outputting music via a speaker system, and displaying images and video on a display.

Generally, terminals can be classified into mobile terminals and stationary terminals according to a presence or non-presence of mobility. And, the mobile terminals can be further classified into handheld terminals and vehicle mount terminals according to availability for hand-carry.

There are ongoing efforts to support and increase the functionality of mobile terminals. Such efforts include software and hardware improvements, as well as changes and improvements in the structural components which form the mobile terminal.

A phone call is a basic medium for exchanging information using a user's voice and a counterpart's voice. Conventionally, a user used to record important information during a phone call by writing a memo of the important information on a memo pad. Yet, as functionality of a mobile terminal is extended, important information can be recorded through a schedule application, a memo application and the like instead of being recorded on a memo pad.

However, in order to run the schedule or memo application, a user should separate a mobile terminal from an ear during a phone call, which may cause a problem that the user is unable to concentrate user's attention on the phone call. After the phone call has ended, if the schedule or memo application is run, it may cause a problem that the user should memorize important information until the end of the phone call.

Thus, the ongoing demand for a method of facilitating an operation of recording important information delivered during a phone call increasingly rises.

SUMMARY OF THE INVENTION

Accordingly, embodiments of the present invention are directed to a mobile terminal and controlling method thereof that substantially obviate one or more problems due to limitations and disadvantages of the related art.

An object of the present invention is to provide a mobile terminal and controlling method thereof, by which user's convenience can be enhanced.

In particular, one object of the present invention is to provide a mobile terminal and controlling method thereof, by which an operation of recording important information delivered during a phone call can be facilitated.

Additional advantages, objects, and features of the invention will be set forth in the disclosure herein as well as the accompanying drawings. Such aspects may also be appreciated by those skilled in the art based on the disclosure herein.

To achieve these objects and other advantages and in accordance with the purpose of the invention, as embodied and broadly described herein, a mobile terminal according to the present invention may include a display unit, a wireless communication unit configured to perform a call, a microphone configured to receive a user voice during the call, an audio output unit configured to output a counterpart voice received through the wireless communication unit during the call, and a controller configured to convert at least one of the user voice or the counterpart voice to a text, extract specific information from the converted text, and, if the call ends, control the extracted specific information to be displayed through the display unit.

In another aspect of the present invention, a method of controlling a mobile terminal according to the present invention may include starting a call with a counterpart terminal, converting at least one of a counterpart voice received from the counterpart terminal or a user voice inputted through a microphone during the call to a text, extracting specific information from the converted text, and if the call ends, displaying the extracted specific information.

Effects obtainable from the present invention may be non-limited by the above mentioned effect. And, other unmentioned effects can be clearly understood from the following description by those having ordinary skill in the technical field to which the present invention pertains.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. The above and other aspects, features, and advantages of the present invention will become more apparent upon consideration of the following description of preferred embodiments, taken in conjunction with the accompanying drawing figures. In the drawings:

FIGS. 7A, 7B and 7C are diagrams for one example of displaying extracted information and an object in response of a reception of a user input for requesting to display the extracted information;

FIGS. 8A, 8B and 8C are diagrams for one example of displaying an indicator on a status display line to indicate a presence of extracted information;

FIGS. 10A, 10B and 10C are diagrams to describe one example of extracting meaningful information in case of receiving a touch input through a touch input unit during a call;

FIGS. 16A and 16B are diagrams to describe one example of inquiring information extracted per character during a call.

DETAILED DESCRIPTION OF THE INVENTION

In the following detailed description, reference is made to the accompanying drawing figures which form a part hereof, and which show by way of illustration specific embodiments of the invention. It is to be understood by those of ordinary skill in this technological field that other embodiments may be utilized, and structural, electrical, as well as procedural changes may be made without departing from the scope of the present invention. Wherever possible, the same reference numbers will be used throughout the drawings to refer to the same or similar parts.

As used herein, the suffixes 'module', 'unit' and 'part' are used for elements in order to facilitate the disclosure only. Therefore, significant meanings or roles are not given to the suffixes themselves and it is understood that the 'module', 'unit' and 'part' can be used together or interchangeably.

The present invention can be applicable to a various types of mobile terminals. Examples of such terminals include mobile phones, user equipments, smart phones, digital broadcast receivers, personal digital assistants, laptop computers, portable multimedia players (PMP), navigators and the like.

Yet, it is apparent to those skilled in the art that a configuration according to an embodiment disclosed in this specification is applicable to such a fixed terminal as a digital TV, a desktop computer and the like as well as a mobile terminal.

Figure 1:
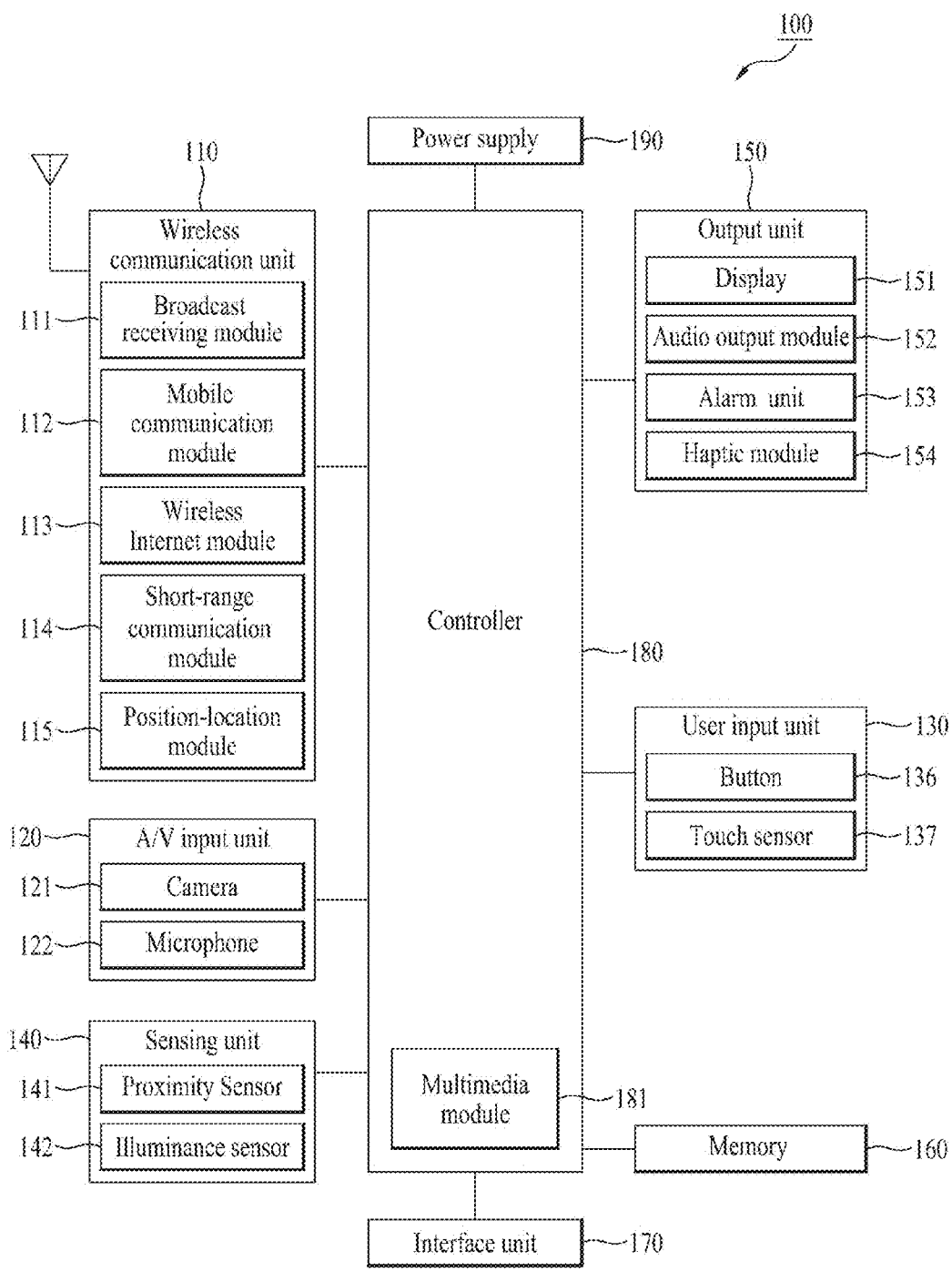
FIG. 1 is a block diagram of a mobile terminal according to one embodiment of the present invention.

FIG. 1 is a block diagram of a mobile terminal 100 in accordance with an embodiment of the present invention. FIG. 1 shows the mobile terminal 100 according to one embodiment of the present invention includes a wireless communication unit 110, an A/V (audio/video) input unit 120, a user input unit 130, a sensing unit 140, an output unit 150, a memory 160, an interface unit 170, a controller 180, a power supply unit 190 and the like. FIG. 1 shows the mobile terminal 100 having various components, but it is understood that implementing all of the illustrated components is not a requirement. Greater or fewer components may alternatively be implemented.

In the following description, the above elements of the mobile terminal 100 are explained in sequence.

First of all, the wireless communication unit 110 typically includes one or more components which permits wireless communication between the mobile terminal 100 and a wireless communication system or network within which the mobile terminal 100 is located. For instance, the wireless communication unit 110 can include a broadcast receiving module 111, a mobile communication module 112, a wireless internet module 113, a short-range communication module 114, a position-location module 115 and the like.

The broadcast receiving module 111 receives a broadcast signal and/or broadcast associated information from an external broadcast managing server via a broadcast channel. The broadcast channel may include a satellite channel and a terrestrial channel. At least two broadcast receiving modules 111 can be provided to the mobile terminal 100 in pursuit of simultaneous receptions of at least two broadcast channels or broadcast channel switching facilitation.

The broadcast managing server generally refers to a server which generates and transmits a broadcast signal and/or broadcast associated information or a server which is provided with a previously generated broadcast signal and/or broadcast associated information and then transmits the provided signal or information to a terminal. The broadcast signal may be implemented as a TV broadcast signal, a radio broadcast signal, and a data broadcast signal, among others. If desired, the broadcast signal may further include a broadcast signal combined with a TV or radio broadcast signal.

The broadcast associated information includes information associated with a broadcast channel, a broadcast program, a broadcast service provider, etc. And, the broadcast associated information can be provided via a mobile communication network. In this case, the broadcast associated information can be received by the mobile communication module 112.

The broadcast associated information can be implemented in various forms. For instance, broadcast associated information may include an electronic program guide (EPG) of digital multimedia broadcasting (DMB) and electronic service guide (ESG) of digital video broadcast-handheld (DVB-H).

The broadcast receiving module 111 may be configured to receive broadcast signals transmitted from various types of broadcast systems. By nonlimiting example, such broadcasting systems include digital multimedia broadcasting-terrestrial (DMB-T), digital multimedia broadcasting-satellite (DMB-S), digital video broadcast-handheld (DVB-H), Convergence of Broadcasting and Mobile Service (DVB-CBMS), Open Mobile Alliance-BroadCAST (OMA-BCAST), China Multimedia Mobile Broadcasting (CMMB), Mobile Broadcasting Business Management System (MBBMS), the data broadcasting system known as media forward link only (MediaFLO®) and integrated services digital broadcast-terrestrial (ISDB-T). Optionally, the broadcast receiving module 111 can be configured suitable for other broadcasting systems as well as the above-explained digital broadcasting systems.

The broadcast signal and/or broadcast associated information received by the broadcast receiving module 111 may be stored in a suitable device, such as a memory 160.

The mobile communication module 112 transmits/receives wireless signals to/from one or more network entities (e.g., base station, external terminal, server, etc.) via a mobile network such as GSM (Global System for Mobile communications), CDMA (Code Division Multiple Access), WCDMA (Wideband CDMA) and so on. Such wireless signals may represent audio, video, and data according to text/multimedia message transceivings, among others.

The wireless internet module 113 supports Internet access for the mobile terminal 100. This module may be internally or externally coupled to the mobile terminal 100. In this case, the wireless Internet technology can include WLAN (Wireless LAN) (Wi-Fi), Wibro (Wireless broadband), Wimax (World Interoperability for Microwave Access), HSDPA (High Speed Downlink Packet Access), GSM, CDMA, WCDMA, LTE (Long Term Evolution) etc.

Wireless internet access by Wibro, HSPDA, GSM, CDMA, WCDMA, LTE or the like is achieved via a mobile communication network. In this aspect, the wireless internet module 113 configured to perform the wireless internet access via the mobile communication network can be understood as a sort of the mobile communication module 112.

The short-range communication module 114 facilitates relatively short-range communications. Suitable technologies for implementing this module include radio frequency identification (RFID), infrared data association (IrDA), ultra-wideband (UWB), as well at the networking technologies commonly referred to as Bluetooth and ZigBee, to name a few.

The position-location module 115 identifies or otherwise obtains the location of the mobile terminal 100. If desired, this module may be implemented with a global positioning system (GPS) module. According to the current technology, the GPS module 115 is able to precisely calculate current 3-dimensional position information based on at least one of longitude, latitude and altitude and direction (or orientation) by calculating distance information and precise time information from at least three satellites and then applying triangulation to the calculated information. Currently, location and time informations are calculated using three satellites, and errors of the calculated location position and time informations are then amended using another satellite. Besides, the GPS module 115 is able to calculate speed information by continuously calculating a real-time current location.

Referring to FIG. 1, the audio/video (A/V) input unit 120 is configured to provide audio or video signal input to the mobile terminal 100. As shown, the A/V input unit 120 includes a camera 121 and a microphone 122. The camera 121 receives and processes image frames of still pictures or video, which are obtained by an image sensor in a video call mode or a photographing mode. And, the processed image frames can be displayed on the display 151.

The image frames processed by the camera 121 can be stored in the memory 160 or can be externally transmitted via the wireless communication unit 110. Optionally, at least two cameras 121 can be provided to the mobile terminal 100 according to environment of usage.

The microphone 122 receives an external audio signal while the portable device is in a particular mode, such as phone call mode, recording mode and voice recognition. This audio signal is processed and converted into electric audio data. The processed audio data is transformed into a format transmittable to a mobile communication base station via the mobile communication module 112 in case of a call mode. The microphone 122 typically includes assorted noise removing algorithms to remove noise generated in the course of receiving the external audio signal.

The user input unit 130 generates input data responsive to user manipulation of an associated input device or devices. Examples of such devices include a button 136 provided to front/rear/lateral side of the mobile terminal 100 and a touch sensor (constant pressure/electrostatic) 137 and may further include a key pad, a dome switch, a jog wheel, a jog switch and the like [not shown in the drawing].

The sensing unit 140 provides sensing signals for controlling operations of the mobile terminal 100 using status measurements of various aspects of the mobile terminal. For instance, the sensing unit 140 may detect an open/close status of the mobile terminal 100, relative positioning of components (e.g., a display and keypad) of the mobile terminal 100, a change of position of the mobile terminal 100 or a component of the mobile terminal 100, a presence or absence of user contact with the mobile terminal 100, orientation or acceleration/deceleration of the mobile terminal 100. By nonlimiting example, such sensing unit 140 include, gyro sensor, accelerate sensor, geomagnetic sensor.

As an example, consider the mobile terminal 100 being configured as a slide-type mobile terminal. In this configuration, the sensing unit 140 may sense whether a sliding portion of the mobile terminal is open or closed. Other examples include the sensing unit 140 sensing the presence or absence of power provided by the power supply 190, the presence or absence of a coupling or other connection between the interface unit 170 and an external device. And, the sensing unit 140 can include a proximity sensor 141.

The output unit 150 generates outputs relevant to the senses of sight, hearing, touch and the like. And, the output unit 150 includes the display 151, an audio output module 152, an alarm unit 153, and a haptic module 154 and the like.

The display 151 is typically implemented to visually display (output) information associated with the mobile terminal 100. For instance, if the mobile terminal is operating in a phone call mode, the display will generally provide a user interface (UI) or graphical user interface (GUI) which includes information associated with placing, conducting, and terminating a phone call. As another example, if the mobile terminal 100 is in a video call mode or a photographing mode, the display 151 may additionally or alternatively display images which are associated with these modes, the UI or the GUI.

The display module 151 may be implemented using known display technologies including, for example, a liquid crystal display (LCD), a thin film transistor-liquid crystal display (TFT-LCD), an organic light-emitting diode display (OLED), a flexible display and a three-dimensional display. The mobile terminal 100 may include one or more of such displays.

Some of the above displays can be implemented in a transparent or optical transmittive type, which can be named a transparent display. As a representative example for the transparent display, there is TOLED (transparent OLED) or the like. A rear configuration of the display 151 can be implemented in the optical transmittive type as well. In this configuration, a user is able to see an object in rear of a terminal body via the area occupied by the display 151 of the terminal body.

At least two displays 151 can be provided to the mobile terminal 100 in accordance with the implemented configuration of the mobile terminal 100. For instance, a plurality of displays can be arranged on a single face of the mobile terminal 100 in a manner of being spaced apart from each other or being built in one body. Alternatively, a plurality of displays can be arranged on different faces of the mobile terminal 100.

In case that the display 151 and the touch sensor 137 configures a mutual layer structure (hereinafter called 'touch screen'), it is able to use the display 151 as an input device as well as an output device. In this case, the touch sensor can be configured as a touch film, a touch sheet, a touchpad or the like.

The touch sensor 137 can be configured to convert a pressure applied to a specific portion of the display 151 or a variation of a capacitance generated from a specific portion of the display 151 to an electric input signal. Moreover, it is able to configure the touch sensor 137 to detect a pressure of a touch as well as a touched position or size.

If a touch input is made to the touch sensor 137, signal(s) corresponding to the touch is transferred to a touch controller. The touch controller processes the signal(s) and then transfers the processed signal(s) to the controller 180. Therefore, the controller 180 is able to know whether a prescribed portion of the display 151 is touched.

Figure 2:
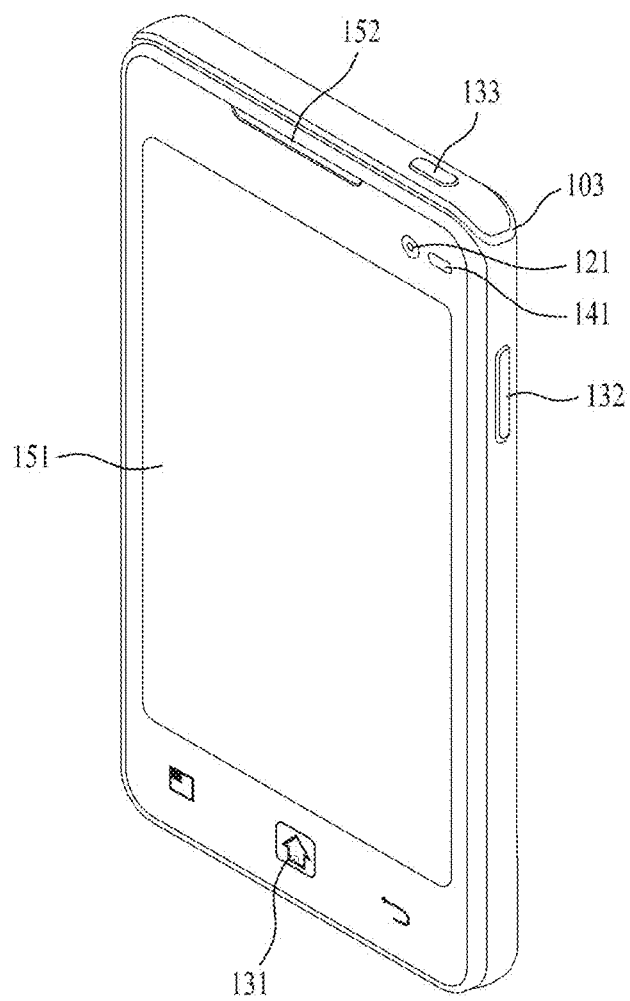
FIG. 2 is a front perspective diagram of a mobile terminal according to one embodiment of the present invention.

Referring to FIG. 2, a proximity sensor (141) can be provided to an internal area of the mobile terminal 100 enclosed by the touchscreen or around the touchscreen. The proximity sensor is the sensor that detects a presence or non-presence of an object approaching a prescribed detecting surface or an object existing around the proximity sensor using an electromagnetic field strength or infrared ray without mechanical contact. Hence, the proximity sensor has durability longer than that of a contact type sensor and also has utility wider than that of the contact type sensor.

The proximity sensor can include one of a transmittive photoelectric sensor, a direct reflective photoelectric sensor, a mirror reflective photoelectric sensor, a radio frequency oscillation proximity sensor, an electrostatic capacity proximity sensor, a magnetic proximity sensor, an infrared proximity sensor and the like. In case that the touchscreen includes the electrostatic capacity proximity sensor, it is configured to detect the proximity of a pointer using a variation of electric field according to the proximity of the pointer. In this case, the touchscreen (touch sensor) can be classified as the proximity sensor.

For clarity and convenience of the following description, as a pointer becomes proximate to a touchscreen without coming into contact with the touchscreen, if the pointer is perceived as situated over the touchscreen, such an action shall be named 'proximity touch'. If a pointer actually comes into contact with a touchscreen, such an action shall be named 'contact touch'. A proximity-touched position over the touchscreen with the pointer may mean a position at which the pointer vertically opposes the touchscreen when the touchscreen is proximity-touched with the pointer.

The proximity sensor detects a proximity touch and a proximity touch pattern (e.g., a proximity touch distance, a proximity touch duration, a proximity touch position, a proximity touch shift state, etc.). And, information corresponding to the detected proximity touch action and the detected proximity touch pattern can be outputted to the touchscreen.

The audio output module 152 functions in various modes including a call-receiving mode, a call-placing mode, a recording mode, a voice recognition mode, a broadcast reception mode and the like to output audio data which is received from the wireless communication unit 110 or is stored in the memory 160. During operation, the audio output module 152 outputs audio relating to a particular function (e.g., call received, message received, etc.). The audio output module 152 is often implemented using one or more speakers, buzzers, other audio producing devices, and combinations thereof.

The alarm unit 153 is output a signal for announcing the occurrence of a particular event associated with the mobile terminal 100. Typical events include a call received event, a message received event and a touch input received event. The alarm unit 153 is able to output a signal for announcing the event occurrence by way of vibration as well as video or audio signal. The video or audio signal can be outputted via the display 151 or the audio output unit 152. Hence, the display 151 or the audio output module 152 can be regarded as a part of the alarm unit 153.

The haptic module 154 generates various tactile effects that can be sensed by a user. Vibration is a representative one of the tactile effects generated by the haptic module 154. Strength and pattern of the vibration generated by the haptic module 154 are controllable. For instance, different vibrations can be outputted in a manner of being synthesized together or can be outputted in sequence.

The haptic module 154 is able to generate various tactile effects as well as the vibration. For instance, the haptic module 154 generates the effect attributed to the arrangement of pins vertically moving against a contact skin surface, the effect attributed to the injection/suction power of air though an injection/suction hole, the effect attributed to the skim over a skin surface, the effect attributed to the contact with electrode, the effect attributed to the electrostatic force, the effect attributed to the representation of hold/cold sense using an endothermic or exothermic device and the like.

The haptic module 154 can be implemented to enable a user to sense the tactile effect through a muscle sense of finger, arm or the like as well as to transfer the tactile effect through a direct contact. Optionally, at least two haptic modules 154 can be provided to the mobile terminal 100 in accordance with the corresponding configuration type of the mobile terminal 100.

The memory unit 160 is generally used to store various types of data to support the processing, control, and storage requirements of the mobile terminal 100. Examples of such data include program instructions for applications operating on the mobile terminal 100, contact data, phonebook data, messages, audio, still pictures (or photo), moving pictures, etc. And, a recent use history or a cumulative use frequency of each data (e.g., use frequency for each phonebook, each message or each multimedia) can be stored in the memory unit 160. Moreover, data for various patterns of vibration and/or sound outputted in case of a touch input to the touchscreen can be stored in the memory unit 160.

The memory 160 may be implemented using any type or combination of suitable volatile and non-volatile memory or storage devices including hard disk, random access memory (RAM), static random access memory (SRAM), electrically erasable programmable read-only memory (EEPROM), erasable programmable read-only memory (EPROM), programmable read-only memory (PROM), read-only memory (ROM), magnetic memory, flash memory, magnetic or optical disk, multimedia card micro type memory, card-type memory (e.g., SD memory, XD memory, etc.), or other similar memory or data storage device. And, the mobile terminal 100 is able to operate in association with a web storage for performing a storage function of the memory 160 on Internet.

The interface unit 170 is often implemented to couple the mobile terminal 100 with external devices. The interface unit 170 receives data from the external devices or is supplied with the power and then transfers the data or power to the respective elements of the mobile terminal 100 or enables data within the mobile terminal 100 to be transferred to the external devices. The interface unit 170 may be configured using a wired/wireless headset port, an external charger port, a wired/wireless data port, a memory card port, a port for coupling to a device having an identity module, audio input/output ports, video input/output ports, an earphone port and/or the like.

The identity module is the chip for storing various kinds of information for authenticating a use authority of the mobile terminal 100 and can include User Identify Module (UIM), Subscriber Identify Module (SIM), Universal Subscriber Identity Module (USIM) and/or the like. A device having the identity module (hereinafter called 'identity device') can be manufactured as a smart card. Therefore, the identity device is connectible to the mobile terminal 100 via the corresponding port.

When the mobile terminal 110 is connected to an external cradle, the interface unit 170 becomes a passage for supplying the mobile terminal 100 with a power from the cradle or a passage for delivering various command signals inputted from the cradle by a user to the mobile terminal 100. Each of the various command signals inputted from the cradle or the power can operate as a signal enabling the mobile terminal 100 to recognize that it is correctly loaded in the cradle.

The controller 180 typically controls the overall operations of the mobile terminal 100. For example, the controller 180 performs the control and processing associated with voice calls, data communications, video calls, etc. The controller 180 may include a multimedia module 181 that provides multimedia playback. The multimedia module 181 may be configured as part of the controller 180, or implemented as a separate component.

Moreover, the controller 180 is able to perform a pattern (or image) recognizing process for recognizing a writing input and a picture drawing input carried out on the touchscreen as characters or images, respectively.

The power supply unit 190 provides power required by the various components for the mobile terminal 100. The power may be internal power, external power, or combinations thereof.

A battery may include a built-in rechargeable battery and may be detachably attached to the terminal body for a charging and the like. A connecting port may be configured as one example of the interface 170 via which an external charger for supplying a power of a battery charging is electrically connected.

Various embodiments described herein may be implemented in a computer-readable medium using, for example, computer software, hardware, or some combination thereof.

For a hardware implementation, the embodiments described herein may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a selective combination thereof. Such embodiments may also be implemented by the controller 180.

For a software implementation, the embodiments described herein may be implemented with separate software modules, such as procedures and functions, each of which perform one or more of the functions and operations described herein. The software codes can be implemented with a software application written in any suitable programming language and may be stored in memory such as the memory 160, and executed by a controller or processor, such as the controller 180.

FIG. 2 is a front perspective diagram of a mobile terminal according to one embodiment of the present invention.

The mobile terminal 100 shown in the drawing has a bar type terminal body. Yet, the mobile terminal 100 may be implemented in a variety of different configurations. Examples of such configurations include folder-type, slide-type, rotational-type, swing-type and combinations thereof. For clarity, further disclosure will primarily relate to a bar-type mobile terminal 100. However such teachings apply equally to other types of mobile terminals.

Referring to FIG. 2A, the mobile terminal 100 includes a case (101, 102, 103) configuring an exterior thereof. In the present embodiment, the case can be divided into a front case 101 and a rear case 102. Various electric/electronic parts are loaded in a space provided between the front and rear cases 101 and 102.

Occasionally, electronic components can be mounted on a surface of the rear case 102. The electronic part mounted on the surface of the rear case 102 may include such a detachable part as a battery, a USIM card, a memory card and the like. In doing so, the rear case 102 may further include a backside cover 103 configured to cover the surface of the rear case 102. In particular, the backside cover 103 has a detachable configuration for user's convenience. If the backside cover 103 is detached from the rear case 102, the surface of the rear case 102 is exposed.

Referring to FIG. 2, if the backside cover 103 is attached to the rear case 102, a lateral side of the rear case 102 may be exposed in part. If a size of the backside cover 103 is decreased, a rear side of the rear case 102 may be exposed in part. If the backside cover 103 covers the whole rear side of the rear case 102, it may include an opening 103' configured to expose a camera 121' or an audio output unit 152' externally.

The cases 101, 102 and 103 are formed by injection molding of synthetic resin or can be formed of metal substance such as stainless steel (STS), titanium (Ti) or the like for example.

A display 151, an audio output unit 152, a camera 121, user input units 130/131 and 132, a microphone 122, an interface 180 and the like can be provided to the case 101 or 102.

The display 151 occupies most of a main face of the front case 101. The audio output unit 152 and the camera 121 are provided to an area adjacent to one of both end portions of the display 151, while the user input unit 131 and the microphone 122 are provided to another area adjacent to the other end portion of the display 151. The user input unit 132 and the interface 170 can be provided to lateral sides of the front and rear cases 101 and 102.

The input unit 130 is manipulated to receive a command for controlling an operation of the terminal 100. And, the input unit 130 is able to include a plurality of manipulating units 131 and 132. The manipulating units 131 and 132 can be named a manipulating portion and may adopt any mechanism of a tactile manner that enables a user to perform a manipulation action by experiencing a tactile feeling.

Content inputted by the first or second manipulating unit 131 or 132 can be diversely set. For instance, such a command as start, end, scroll and the like is inputted to the first manipulating unit 131. And, a command for a volume adjustment of sound outputted from the audio output unit 152 and the like can be inputted to the second manipulating unit 132, a command for a switching to a touch recognizing mode of the display 151 and the like can be inputted to the second manipulating unit 133.

Figure 3:
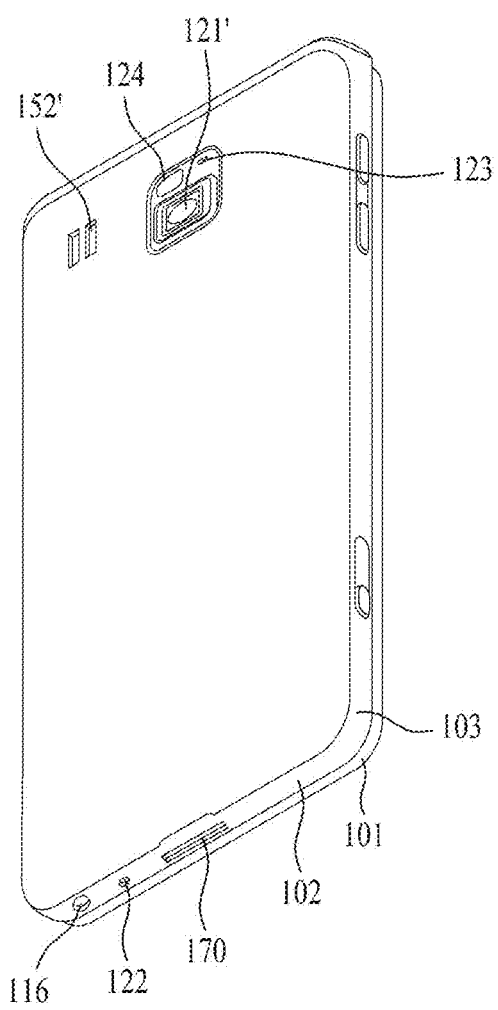
FIG. 3 is a rear perspective diagram of a mobile terminal according to one embodiment of the present invention.

FIG. 3 is a perspective diagram of a backside of the terminal shown in FIG. 2.

Referring to FIG. 3, a camera 121' can be additionally provided to a backside of the terminal body, and more particularly, to the rear case 102. The camera 121 has a photographing direction that is substantially opposite to that of the former camera 121 shown in FIG. 2 and may have pixels differing from those of the firmer camera 121.

Preferably, for instance, the former camera 121 has low pixels enough to capture and transmit a picture of user's face for a video call, while the latter camera 121' has high pixels for capturing a general subject for photography without transmitting the captured subject. And, each of the cameras 121 and 121' can be installed at the terminal body to be rotated or popped up.

A flash 123 and a mirror 124 are additionally provided adjacent to the camera 121'. The flash 123 projects light toward a subject in case of photographing the subject using the camera 121'. In case that a user attempts to take a picture of the user (self-photography) using the camera 121', the mirror 124 enables the user to view user's face reflected by the mirror 124.

An additional audio output unit 152' can be provided to the backside of the terminal body. The additional audio output unit 152' is able to implement a stereo function together with the former audio output unit 152 shown in FIG. 2 and may be used for implementation of a speakerphone mode in talking over the terminal.

A broadcast signal receiving antenna 116 can be additionally provided to the lateral side of the terminal body as well as an antenna for communication or the like. The antenna 116 constructing a portion of the broadcast receiving module 111 shown in FIG. 1 can be retractably provided to the terminal body.

Figure 4:
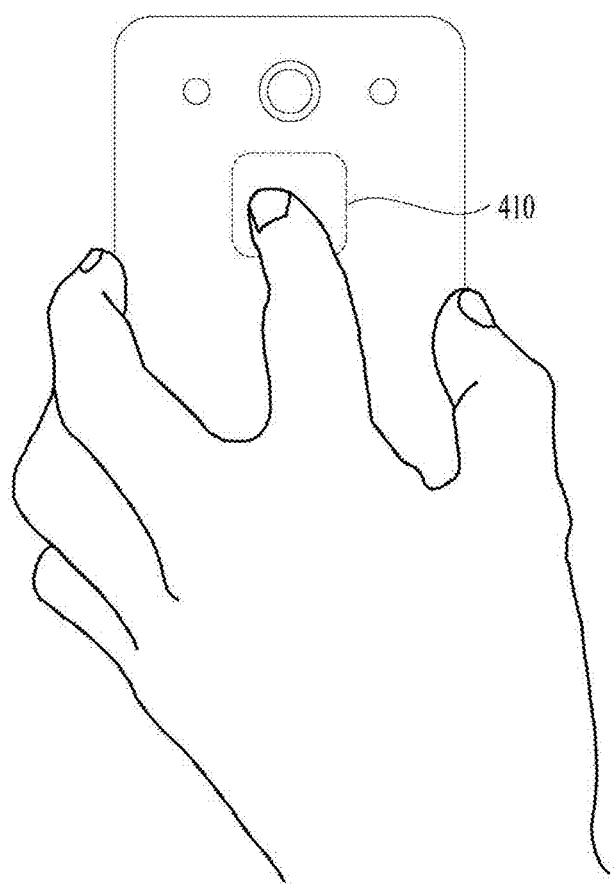
FIG. 4 is a diagram for one example of an input unit provided to a rear side of a mobile terminal.

An input unit 410 configured to receive a touch input from a user may be provided to a rear side of a mobile terminal according to the present invention. For instance, FIG. 4 is a diagram for one example of an input unit 410 provided to a rear side of a mobile terminal Like the example shown in FIG. 4, the input unit 410 for receiving a user input may be exposed from the rear side of the mobile terminal. A type of the input unit 410 exposed from the rear side may include a touch panel capable of receiving a touch or a physical button. Although a user holds a mobile terminal to an ear to receive a phone call, the user can appropriately control the mobile terminal by touching or manipulating the input unit 410 exposed from the rear side of the mobile terminal.

For clarity and convenience of the following description, assume that a mobile terminal according to the present invention includes at least one of the components shown in FIG. 1. In particular, assume that a mobile terminal 100 according to the present invention includes the wireless communication unit 110, the microphone 122, the display unit 151, the audio output unit 152, the memory 160 and the controller 180. In some cases, assume that the mobile terminal 100 according to the present invention may further include the input unit 410 shown in FIG. 4.

If the display unit 151 includes a touchscreen, implementation of the present invention can be further facilitated. Hence, in the following description, assume that the display unit 151 includes the touchscreen. And, assume that the input unit 410 provided to the rear side of the mobile terminal 100 includes a touch input unit 410 capable of receiving a touch input from a user.

Figure 5:
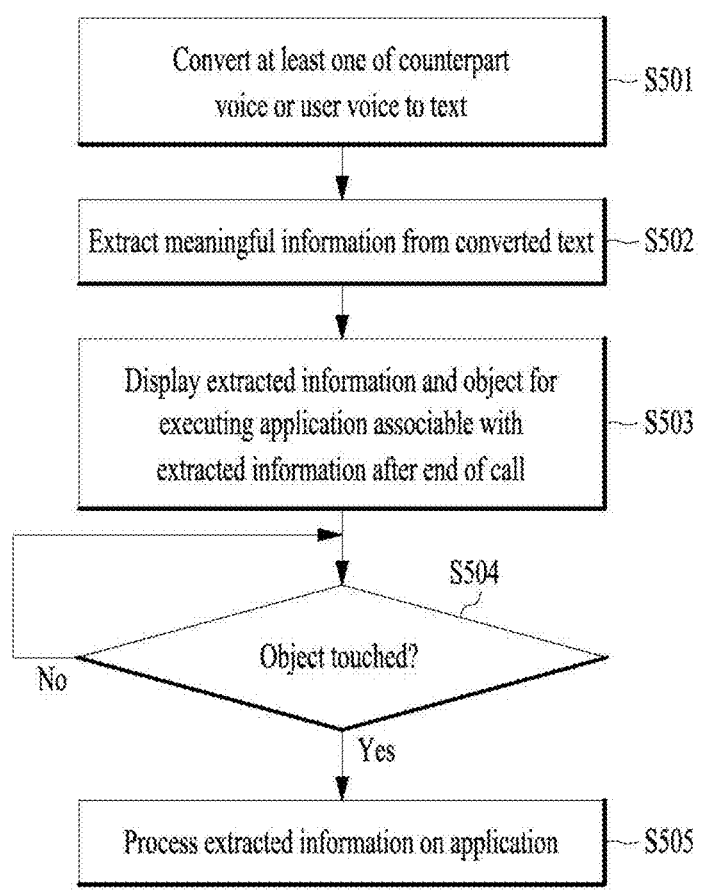
FIG. 5 is a flowchart for an operation of a mobile terminal according to the present invention.

FIG. 5 is a flowchart for an operation of a mobile terminal according to the present invention.

Referring to FIG. 5, for clarity of the following description, assume that the mobile terminal is making a call with a prescribed counterpart initially. The call mentioned in the description of the present invention may include a means for exchanging information with a prescribed counterpart through voice like a voice call, a video call, an internet call (e.g., VoIP (voice over internet protocol)) or the like.

Once a call starts, the controller 180 transmits a user voice inputted through the microphone 122 to a prescribed counterpart through the wireless communication unit 110 and is able to output a counterpart voice, which is received through the wireless communication unit 110, through the audio output unit 152. If such an audio output device as an earphone, a headset or the like is connected to the mobile terminal, the controller 180 can control the counterpart voice to be outputted not through the audio output unit 152 but through the audio output device connected to the mobile terminal.

The mobile terminal according to the present invention can convert at least one of the user voice inputted through the microphone 122 and the counterpart voice received through the wireless communication unit 110 to a text [i.e., STT (speech to text) conversion] [S501]. The controller 180 extracts meaningful information from the converted text [S502] and is then able to save the extracted information in the memory 160. In this case, the meaningful information may include a word used repeatedly over a prescribed count (e.g., 3 times) during a call, information corresponding to information previously saved in the memory 160 in part at least, a word (e.g., appointment, Monday, afternoon, etc.) previously set by a user, and the like. And, the meaningful information may include at least one of character identification information, place information and time information.

For instance, in case that information estimated as identification information (e.g., a name of a specific character a nickname of a specific character, a phone number of a specific character, an email address of a specific character, an SNS (social network service) account number of a specific character, etc.) on a specific character is discovered from the converted text, the controller 180 extracts the information discovered from the converted text and is then able to save the extracted information in the memory 160. For another instance, in case that information estimated as place information such as a place name, a place, an administrative district name or the like is discovered from the converted text, the controller 180 extracts the information discovered from the converted text and is then able to save the extracted information in the memory 160. For further instance, if information estimated as time information such as a date, a day of the week, a time and the like is discovered from the converted text, the controller 180 extracts the information discovered from the converted text and is then able to save the extracted information in the memory 160.

If the call ends, the controller 180 can control the informations extracted during the call to be displayed [S503].

Moreover, the controller 180 can display objects for running applications associable with the extracted informations [S503].

In this case, the applications associable with the extracted informations may be determined in accordance with attributes of the extracted informations. For instance, if the information extracted during the call includes character identification information, the applications associable with the character identification information may include a call application for making a phone call to a corresponding character, a message application for sending a message to a corresponding character, an email application for sending a message to a corresponding character, a phonebook application for registering information on a corresponding character at a phonebook, a memo application for registering the character identification information as a memo, and the like. For another instance, in case that the information extracted during the call includes place information, the applications associable with the place information may include a map application for checking a location indicated by the place information on a map, a schedule application for registering a schedule taking place at a location indicated by the place information, a memo application for registering the place information as a memo, and the like. For further instance, if the information extracted during the call includes time information, the applications associable with the time information may include an alarm application for setting an alarm for a time indicated by the time information, schedule information for registering a schedule taking place at a time indicated by the time information, a memo application for registering the time information as a memo, and the like.

Moreover, an object for running an application associable with the extracted informations may have a shape of an icon, a button or the like.

Figure 6:
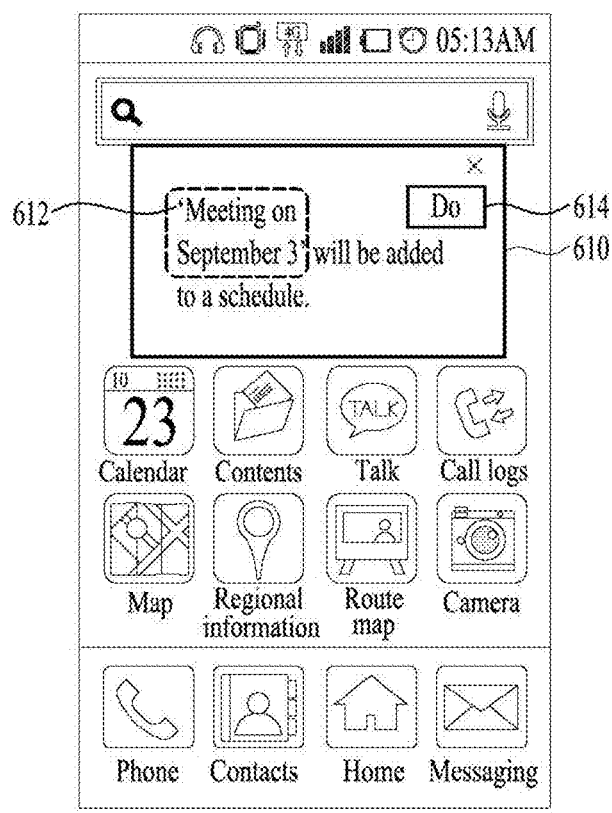
FIG. 6 is a diagram for one example of displaying extracted information and an object for running an application associated with the extracted information through the display unit.

For instance, FIG. 6 is a diagram for one example of displaying extracted information and an object for running an application associated with the extracted information through the display unit 151. If the call ends, the controller 180 can control a home screen or a screen, which was displayed right before the call starts, to be displayed. In doing so, if information extracted during the call exists, the controller 180 can control the information extracted during the call to be displayed after the end of the call. Moreover, the controller 180 can control an object, which is provided to run an application associable with the extracted information, to be displayed as well.

For instance, according to the example shown in FIG. 6, time information 612 'Meeting on September 3' and a button 614 for running schedule information are displayed through a popup window 610 in order to add a schedule 'Meeting' to 'September 3'.

According to the example shown in FIG. 6, if the call ends, the information extracted during the call is automatically displayed through the popup window 610. Optionally, only if receiving a user input for requesting to display the extracted information, the controller 180 may control the extracted information and the object to be displayed.

For instance, FIGS. 7A to 7C are diagrams for one example of displaying extracted information and an object in response of a reception of a user input for requesting to display the extracted information. Referring to FIGS. 7A to 7C, if a call ends, the controller 180 can control a call record, which includes save a call start time (or a call end time), a call time, an information on a call counterpart and the like, to be saved in the memory 160. If a plurality of call records exist, referring to FIG. 7A, the controller 180 can control a call history list to be displayed through the display unit 151.

If a prescribed item (e.g., Johnny in FIG. 7A) is selected from the call history list, referring to FIG. 7B, the controller 180 can control a call record screen, which corresponds to the selected item, to be displayed. According to the example shown in FIG. 7B, the call record screen including a call start time and total call time 712, an information on a called counterpart (particularly, a name and phone number of a counterpart) 714 and the like is displayed. In doing so, the controller 180 can control a region (or button), which is provided to check an information extracted from the corresponding call, to be included in the call record screen. If the region (or button) (e.g., a region 'smart call note' shown in FIG. 7B) for checking the extracted information is touched, referring to FIG. 7C, the controller 180 can control an information extracted during the call and an object, which is provided to run an application associable with the extracted information, to be displayed. According to the example shown in FIG. 7C, displayed are a name 'David Kim' 732 of a specific character & application icons (i.e., a call icon 734 and a message icon 736) associable with the name 732, a specific address 'LA-415 New Roads' 742 & application icons (i.e., a map icon 744 and a schedule icon 746) associable with the specific address 742, and a specific time 'December 31 10:100 AM Coex Conference' 752 & applications (i.e., an alarm icon 754 and a schedule icon 756) associable with the specific time 752.

According to the example shown in FIGS. 7A to 7C, if the specific region (or button) in the call record screen is touched, the extracted information and object are displayed. And, it is a matter of course that the extracted information and object can be displayed by receiving a user input of a prescribed type other than shown in FIGS. 7A to 7C. For instance, the controller 180 may control the extracted information and object to be displayed on the call record screen that is displayed by selecting a prescribed item from the call history list. If a user input for intending to run an application for checking the extracted information is received, the controller 180 can control the extracted information and object to be displayed.

Besides, if meaningful information is extracted from a text converted during a call, the controller 180 can control the extracted information to be displayed on the display unit 151 by real time [not shown in the drawing].

For another instance, the controller 180 may be able to display an indicator, which indicates a presence of extracted information, on a status display line. For example, FIGS. 8A to 8C are diagrams for one example of displaying an indicator on a status display line to indicate a presence of extracted information. After a call has ended, if information extracted from the corresponding call exists, referring to FIG. 8A, the controller 180 can control an indicator 812, which indicates a presence of the information extracted during the call, to be displayed on a status display line 810. In doing so, if a pointer with which the status display line 810 is touched is dragged toward a bottom end portion, the controller 180 can control a region (or button) (e.g., a region 'smart call note' 820 in FIG. 8B), which is provided to check information extracted during the call, to be included in a notification window for notifying events occurring in the mobile terminal Thereafter, if the region (or button) 820 for checking the extracted information is touched, referring to FIG. 8C, the controller 180 can control the information extracted during the call and an object, which is provided to run an application associable with the extracted information, to be displayed.

If the object for running the application associable with the extracted information is touched [S504], the controller 180 executes the corresponding application and is then able to process a prescribed task on the running application using the extracted information [S505].

For instance, FIGS. 9A to 9F are diagrams to describe an operation of a mobile terminal in case of touching an object for running an application associable with an extracted item.

Figure 9A:
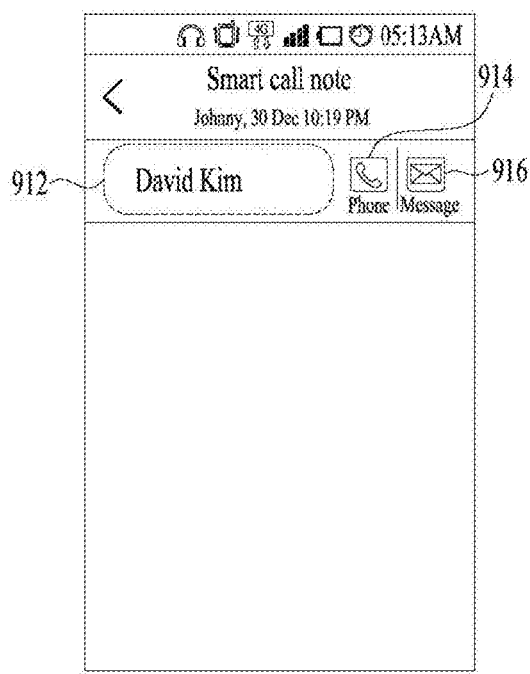
FIGS. 9A, 9B, 9C, 9D, 9E and 9F are diagrams to describe an operation of a mobile terminal in case of touching an object for running an application associable with an extracted item.
Figure 9B:

Referring to FIGS. 9A to 9F, if character identification information is extracted during a call, the controller 180 can control objects, which are provided to run a call application, a message application, an email application, a phonebook application and the like, to be displayed together with the extracted information. Referring to FIG. 9A, a call icon 914 for making a phone call to 'David Kim' 912 and a message icon 916 for sending a message to the 'David Kim' 912 are displayed. If the call icon 914 is touched [FIG. 9A], the controller 180 can make a phone call to a character 'David Kim' [FIG. 9B]. In particular, if the character 'David Kim' is found from a phonebook, the controller 180 can make a phone call to a phone number of the found character. Besides, if the message icon 916 is touched, the controller 180 may control a message compose screen, which is provided to compose a message having a phone number of 'David Kim' designated as a recipient, to be displayed [not shown in the drawing]. Moreover, if an email icon is touched, the controller 180 may control an email compose screen, which is provided to compose an email having an email address of 'David Kim' designated as a recipient, to be displayed [not shown in the drawing]. If a phonebook icon is touched, the controller 180 may control a registration screen (e.g., a screen for registering personal information such as a phone number, an address, an email address, etc.), which is provided to register 'David Kim' at a phonebook, to be displayed [not shown in the drawing]. If a memo icon is touched, the controller 180 may control a screen, which is provided to add a text string 'David Kim' as a memo, to be displayed [not shown in the drawing].

Figure 9C:
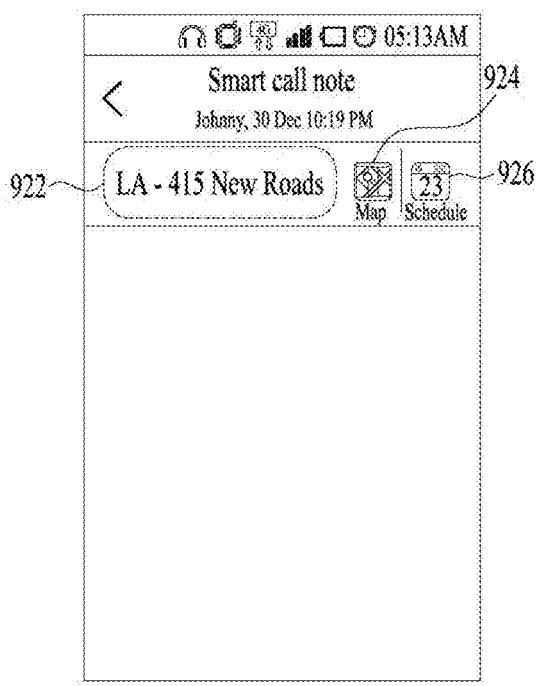
Figure 9D:
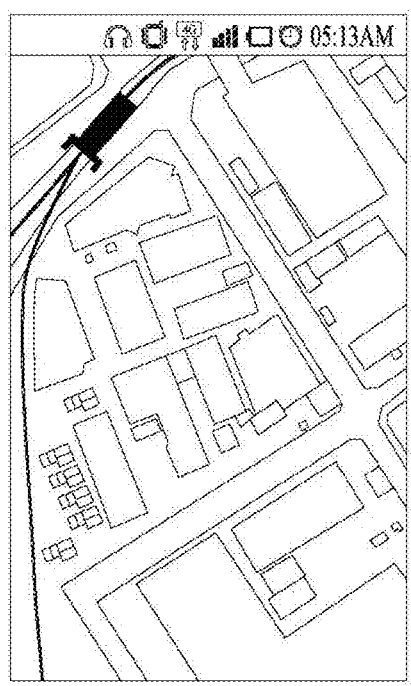

If place information is extracted during a call, the controller 180 can control objects, which are provided to run a map application, a schedule application and the like, to be displayed together with the extracted information. Referring to FIG. 9C, a map icon 924 for checking an address 'LA-415 New Roads' 922 on a map and a schedule icon 926 for registering a schedule taking place at the corresponding address are displayed for example. If the map icon 924 is touched [FIG. 9C], the controller 180 can control a map image mapped to the address 'LA-415 New Roads' to be displayed [FIG. 9D]. Besides, if the schedule icon 926 is touched, the controller 180 may control a registration screen (e.g., a start time of a schedule, an end time of the schedule, an alarm output setup, etc.), which is provided to register a new schedule at the place 'LA-415 New Roads', to be displayed [not shown in the drawing]. If a memo icon is touched, the controller 180 may control a screen, which is provided to add a text string 'LA-415 New Roads' as a memo, to be displayed [not shown in the drawing].

Figure 9E:
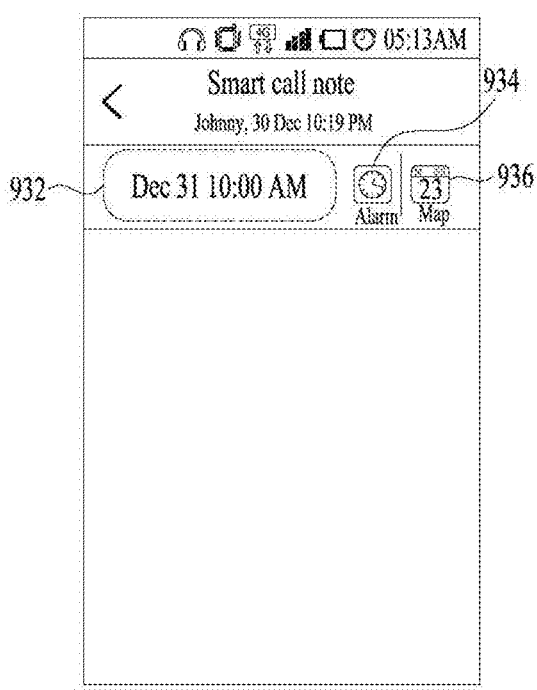
Figure 9F:
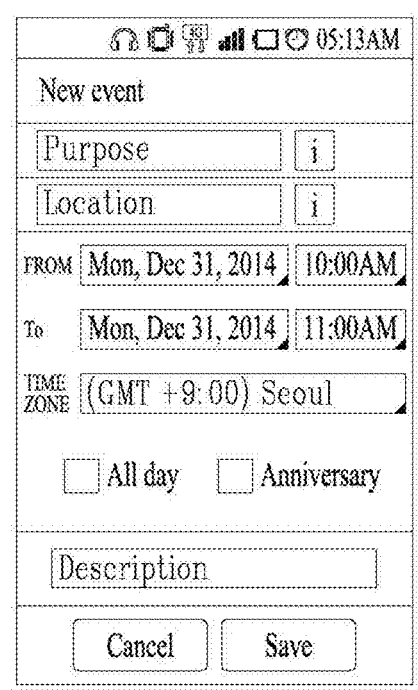

If time information is extracted during a call, the controller 180 can control objects, which are provided to run an alarm application, a schedule application and the like, to be displayed together with the extracted information. Referring to FIG. 9E, an alarm icon 934 for setting an alarm for 'December 31 10:00 AM' 932 and a schedule icon 936 for registering a schedule taking place at the corresponding time are displayed for example. If the schedule icon 936 is touched [FIG. 9E], the controller 180 can control a registration screen, which is provided to register a schedule to take place at 'December 31 10:00 AM', to be displayed [FIG. 9F]. Besides, if the alarm icon 934 is touched, the controller 180 may control a registration screen, which is provided to register an alarm set for 'December 31 10:00 AM', to be displayed [not shown in the drawing]. If a memo icon is touched, the controller 180 may control a screen, which is provided to add a text string 'December 31 10:00 AM' as a memo, to be displayed [not shown in the drawing].

According to the present invention, the controller 180 can extract at least one of character identification information, place information and time information from a converted text. Yet, if it is unable to determine clearly whether a prescribed text string corresponds to a character, a place or a time or a user voice or a counterpart voice is incorrectly recognized, a part substantially desired by a user may not be extracted.

Therefore, according to the present invention, the controller 180 may extract a text, which corresponds to a user voice or a counterpart voice, as meaningful information in case of receiving a user's input. In particular, if a prescribed touch input is applied to the touch input unit 410 exposed from the rear side of the mobile terminal during a call, the controller 180 can extract a part, which corresponds to a counterpart voice or a user voice on receiving the prescribed touch input, from a converted text.

For instance, FIGS. 10A to 10C are diagrams to describe one example of extracting meaningful information in case of receiving a touch input through a touch input unit during a call. For clarity of the following description, assume that a call content is the same as shown in FIG. 10A. Referring to FIG. 10B, if a prescribed touch input is received during a call, the controller 180 can extract a part, which corresponding to a counterpart or user voice on receiving the touch input, as meaningful information from a converted text. For instance, when the touch input is received, if a counterpart is speaking 'Let's meet at Gangnam Station in the afternoon tomorrow.', referring to FIG. 10C, the controller 180 may save a text string 'Let's meet at Gangnam Station in the afternoon tomorrow.' As meaningful information in the memory 160.

After the end of the call, the controller 180 can control the information, which is extracted in response to the user's touch input during the call, to be emphatically displayed. In particular, the controller 180 may control the extracted information to be displayed in a letter style indicated by a touch pattern inputted by the user or may control the extracted information to be displayed together with a figure indicated by a touch pattern inputted by the user.

Figure 11A:
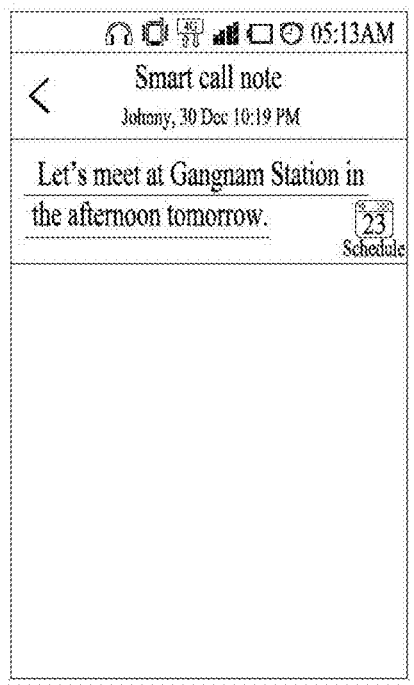
FIGS. 11A and 11B are diagrams for one example of displaying extracted information in a manner of emphasizing the extracted information in response to a user's touch input.
Figure 11B:
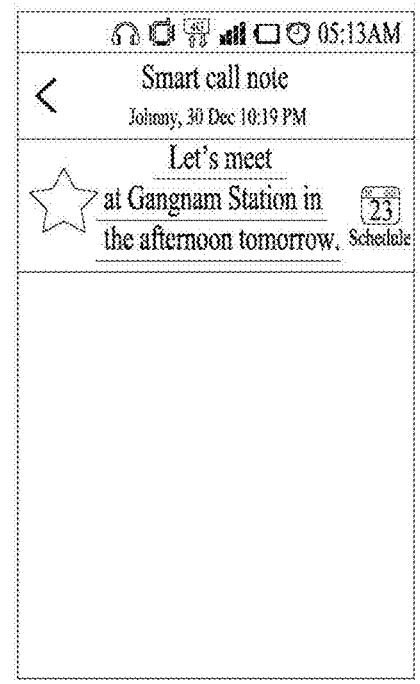

For instance, FIGS. 11A and 11B are diagrams for one example of emphatically displaying extracted information in response to a user's touch input. Referring to FIG. 11A, if a user applies a touch input of moving a pointer in one direction, the controller 180 can emphatically display extracted information by underlining it. For another example, if a user applies a touch input of a star shape during a call (i.e., if a touch input trace of the pointer draws a start shape), referring to FIG. 11B, the controller 180 can emphatically display the extracted information by displaying a figure of the start shape.

According to the examples shown in FIG. 11A and FIG. 11B, if extracted information is emphatically displayed in response to a touch input, it is advantageous in that a user can easily recognize a part intended to be recorded by the user. Moreover, when extracted information is displayed in response to a user's touch input, it is a matter of course that an object for running an application associable with the extracted information can be displayed together.

According to the example shown in FIGS. 10A to 10C, if a touch input is received through the touch input unit 410 during a call, a part corresponding to a counterpart or user voice on receiving the touch input can be extracted as meaningful information. Yet, if a user or counterpart voice is not inputted on receiving the touch input, the controller 180 is unable to accurately specify whether to extract the user or counterpart voice occurring before the reception of the touch input or the user or counterpart voice occurring after the reception of the touch input as meaningful information.

Therefore, according to the present invention, if a touch input of a first type is received through the touch input unit 410, the mobile terminal can extract a part corresponding to a user or counterpart voice occurring before the reception of the touch input as meaningful information. If a touch input of a second type is received through the touch input unit 410, the mobile terminal can extract a part corresponding to a user or counterpart voice occurring after the reception of the touch input as meaningful information.

For instance, FIGS. 12A to 12F are diagrams for examples of operations of a mobile terminal in case of applying a touch input of a first type and a touch input of a second type, respectively. For clarity of the following description, assume that a touch input of a first type includes an input of dragging a pointer in a width direction. And, assume that a touch input of a second type includes an input of dragging a pointer in a length direction.

Figure 12C:
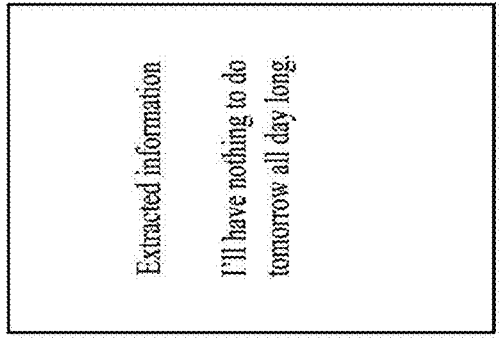
FIGS. 12A, 12B, 12C, 12D, 12E and 12F are diagrams for examples of operations of a mobile terminal in case of applying a touch input of a first type and a touch input of a second type, respectively.
Figure 12B:
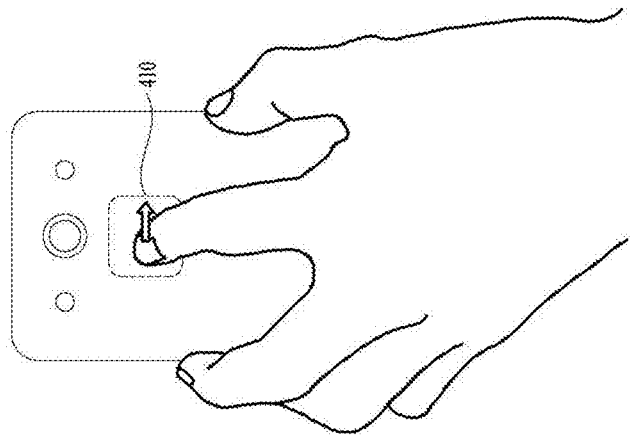
Figure 12A:
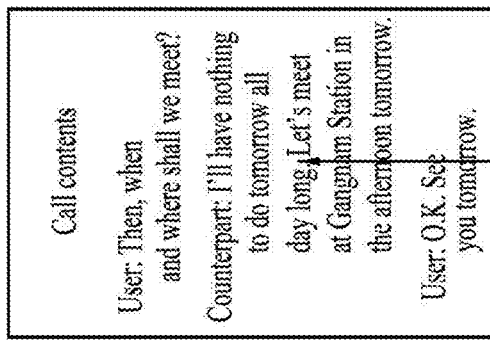

Referring to FIGS. 12A to 12C, if a touch input of a first type is received during a call, the controller 180 can extract a part corresponding to a user or counterpart voice occurring before the reception of the touch input as meaningful information.

Figure 12F:
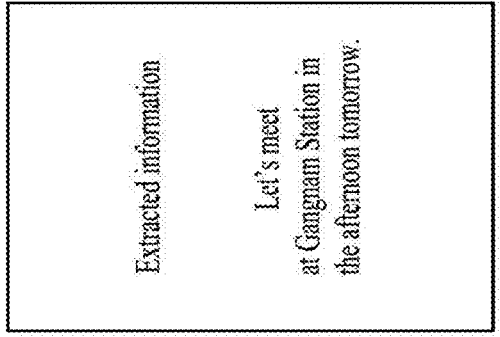
Figure 12E:
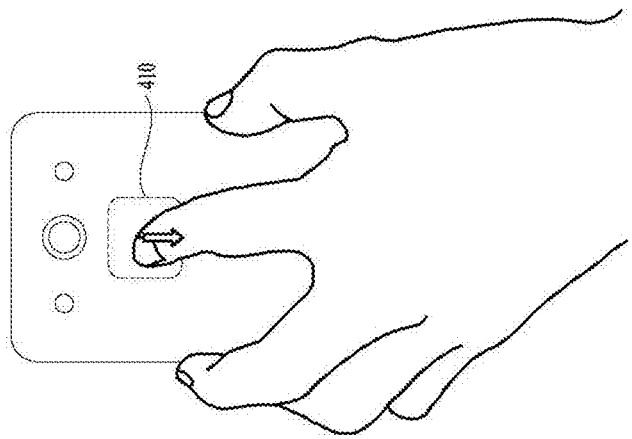
Figure 12D:
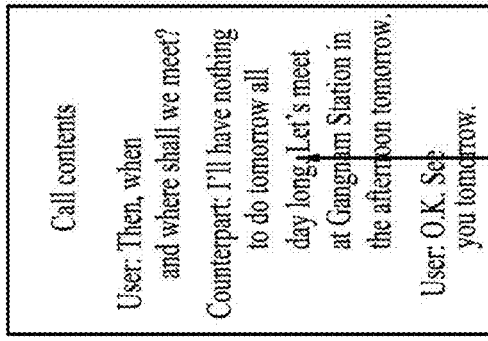

On the other hand, referring to FIGS. 12D to 12F, if a touch input of a second type is received during a call, the controller 180 can extract a part corresponding to a user or counterpart voice occurring after the reception of the touch input as meaningful information.

According to the examples shown in FIGS. 12A to 12F, the touch input of the first type and the touch input of the second type are distinguished from each other by a moving direction of the pointer. Alternatively, it is a matter of course that the touch input of the first type and the touch input of the second type can be distinguished from each other by a touch count, a shape of an inputted pattern or the like.

Moreover, if a contact between the touch input unit 410 and the pointer is maintained, the controller 180 may be able to extract all parts corresponding to a user or counter voice generated during the contact with the pointer as meaningful information.

If extracted information is related to an operation performed in the mobile terminal before a call, the mobile terminal according to the present invention can control the corresponding information to be emphatically displayed.

For instance, FIGS. 13A to 13D are diagrams for examples of emphatically displaying informations related to operations performed in a mobile terminal before making a phone call, respectively.

Figure 13A:
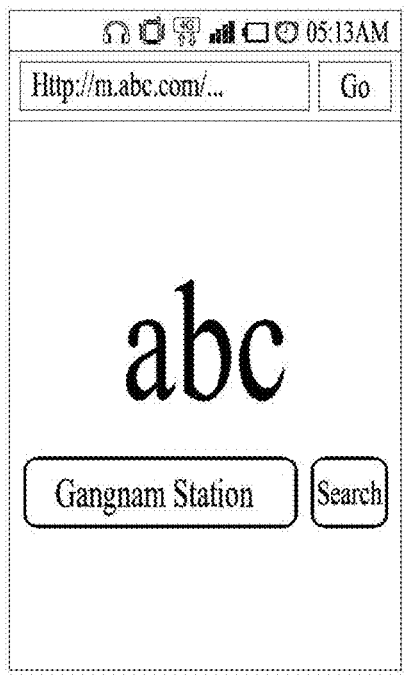
FIGS. 13A, 13B, 13C and 13D are diagrams for examples of emphatically displaying informations related to operations performed in a mobile terminal before making a phone call, respectively.
Figure 13B:
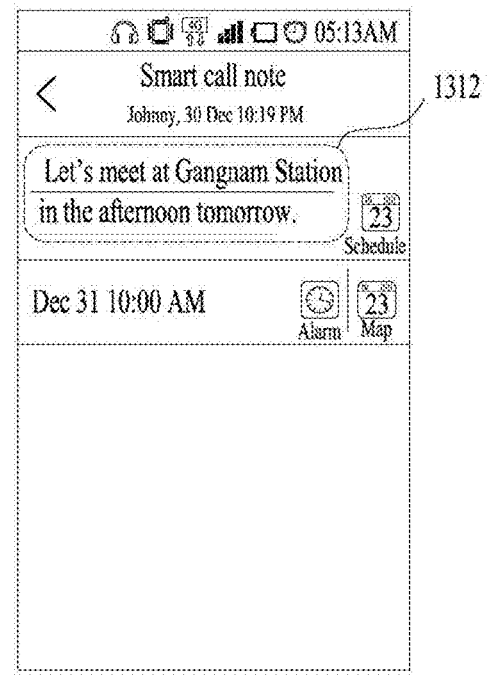

Referring to FIGS. 13A and 13B, if a user performs a search through an internet browser using a prescribed keyword before a call and extracted information 1312 including the keyword exists [FIG. 13A], the controller 180 can control the extracted information 1312 including the keyword to be emphatically displayed [FIG. 13B]. In particular, according to the example shown in FIG. 13B, the extracted information 1312 is emphatically displayed by being underlined.

Figure 13C:
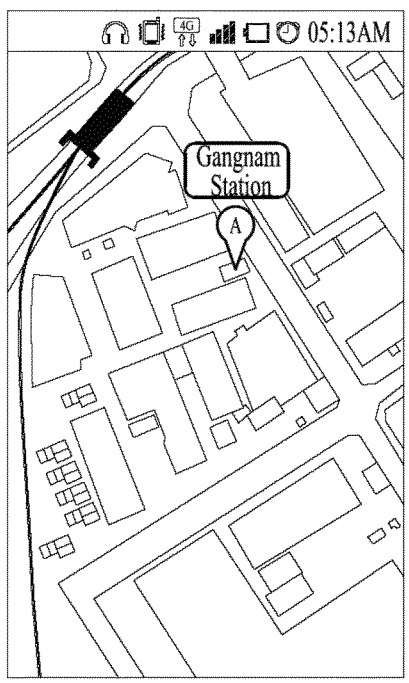
Figure 13D:
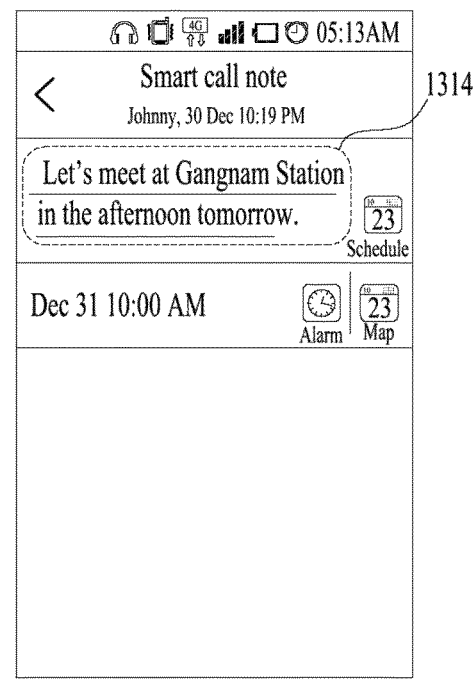

For another instance, referring to FIGS. 13C and 13D, if a user confirms a prescribed location through a map before a call and extracted information 1314 indicates a place located adjacent to the user-confirmed map [FIG. 13C], the controller 180 can control the corresponding information 1314 to be emphatically displayed [FIG. 13D]. In particular, according to the example shown in FIG. 13D, the extracted information 1314 is emphatically displayed by being underlined.

In displaying extracted information, the controller 180 can determine a background image in consideration of a time, date and/or the like at the time of a call.

Figure 14A:
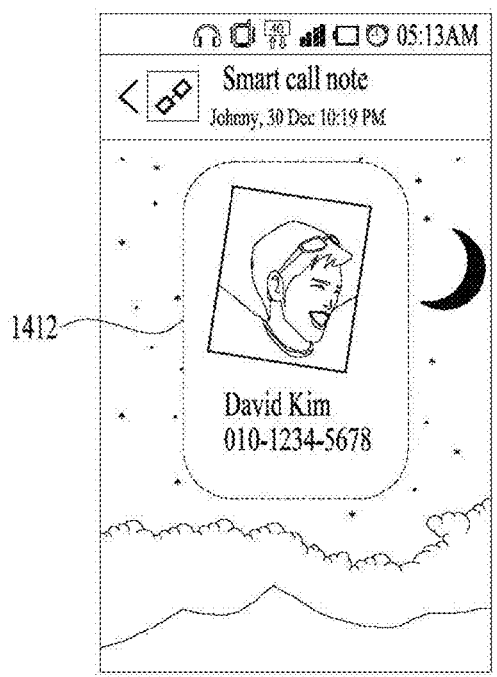
FIGS. 14A and 14B are diagrams for one example of determining a background image extracted in consideration of a time, a date and/or the like at the time of a call.
Figure 14B:
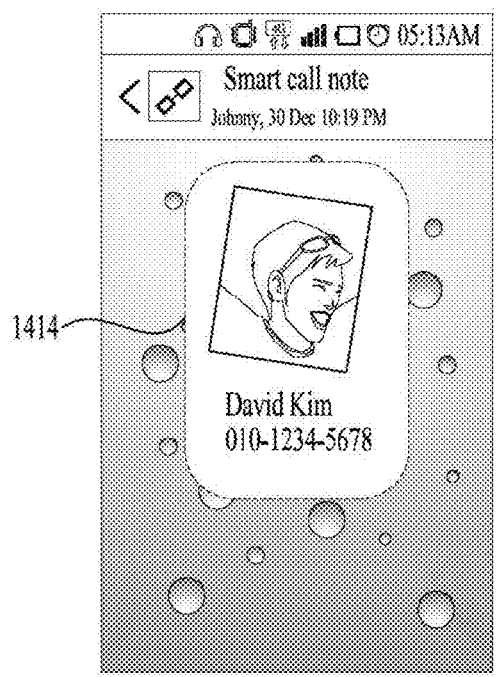

For instance, FIGS. 14A and 14B are diagrams for one example of determining a background image extracted in consideration of a time, a date and/or the like at the time of a call. Referring to FIGS. 14A and 14B, if a call time slot corresponds to a night, the controller 180 can control extracted information 1412 to be displayed using an image of a photographed night scene as a background. Referring to FIG. 14B, when a call is made, if a weather is rainy, the controller 180 can control extracted information 1414 to be displayed using an image of a rainy scene as a background.

According to the examples shown in FIGS. 14A and 14B, the controller 180 can control extracted information to be displayed over an image matching a situation at the time of a call.

According to the embodiments mentioned in the foregoing description, extracted information is displayed as a text. For another instance, the mobile terminal according to the present invention may control an image, which is associated with an extracted item, to be displayed.

Figure 15A:
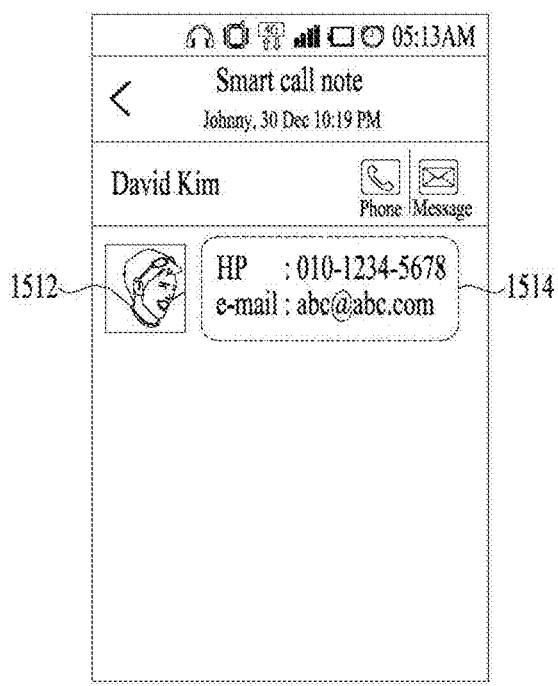
FIGS. 15A, 15B and 15C are diagrams for examples of displaying an image associated with an extracted item, respectively.
Figure 15B:
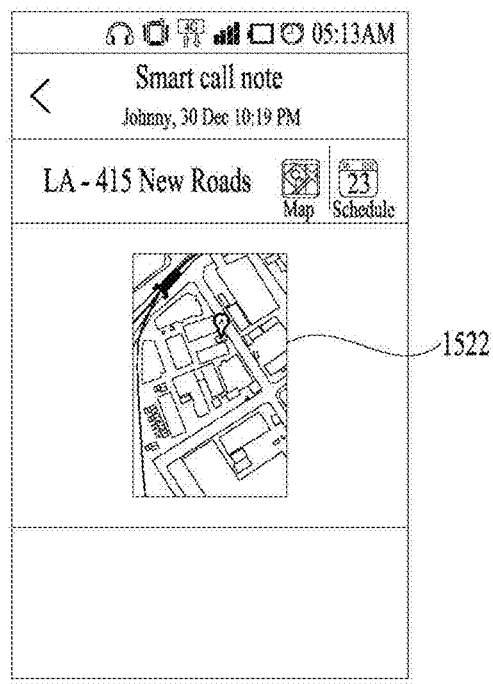
Figure 15C:
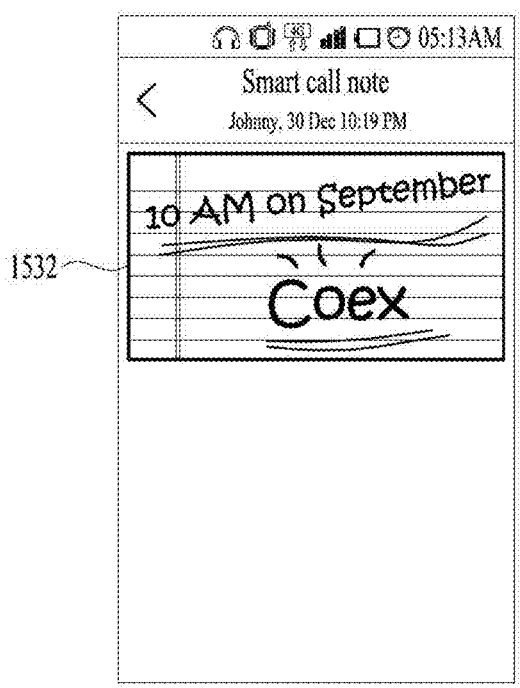

For instance, FIGS. 15A to 15C are diagrams for examples of displaying an image associated with an extracted item, respectively. If a name of a specific character is extracted during a call, referring to FIG. 15A, the controller 180 can control a photo 1512 of the corresponding character to be displayed after an end of the call. In particular, the controller 180 can control at least one of the photos of the corresponding character saved in the memory 160 to be displayed. Moreover, if the corresponding character is registered at a phonebook, the controller 180 can control a contact 1514 (e.g., a phone number, an email address, etc.) of the corresponding character to be displayed as well.

For another instance, if information estimated as an address is extracted during a call, referring to FIG. 15B, the controller 180 can control a map image 1522, which indicates a location indicated by the extracted information, to be displayed after an end of the call.

The mobile terminal according to the present invention creates an image based on an extracted image and is then able to control the created image to be displayed. For instance, referring to FIG. 15C, the controller 180 creates an image 1532 of decorating extracted information to look like a handwriting and is then able to control the created image 1532 to be displayed.

Besides, if extracted information is provided to guide a user with a specific place, the controller 180 creates a rough map image based on the extracted information and is then able to control the created rough map image to be displayed [not shown in the drawing].

According to the embodiments mentioned in the foregoing description, if a call ends, information extracted from the corresponding call can be displayed. In particular, according to the embodiments mentioned in the foregoing description, extracted information can be inquired per call.

For another instance, the mobile terminal according to the present invention can be set to inquire extracted information per character. In particular, if a user input for requesting a display of extracted information during a call with a specific character is received, the controller 180 gathers the extracted informations for a prescribed time during the call with the specific character and is able to control the gathered informations to be displayed.

FIGS. 16A and 16B are diagrams to describe one example of inquiring information extracted per character during a call.

Referring to FIGS. 16A and 16B, if a user input of requesting a display of per-character extracted information is received, the controller 180 collects extracted informations per character and is then able to control the collected informations to be displayed. For instance, after a user input for intending to display per-character extracted informations is received, if a specific character is selected, the controller 180 can control the informations collected during a call with the specific character to be displayed. For instance, referring to FIG. 16A, if a tab 'HONG Gil Dong' 1610 is selected from the tabs for the respectively characters, the controller 180 can control the informations, which were collected during the call with 'HONG Gil Dong', to be displayed.

If another character is selected from the tabs shown in FIG. 16A, the controller 180 may control the informations collected for the selected character to be displayed. For instance, referring to FIG. 16B, if a tab 'Jane' 1620 is selected from the tabs for the respectively characters, the controller 180 can control the informations, which were collected during the call with 'Jane', to be displayed.

Accordingly, embodiments of the present invention provide various effects and/or features.

First of all, the present invention can provide a mobile terminal and controlling method thereof, by which user's convenience can be enhanced.

Secondly, the present invention can provide a mobile terminal and controlling method thereof, by which an operation of recording important information delivered during a call can be facilitated.

It will be appreciated by those skilled in the art that the present invention can be specified into other form(s) without departing from the spirit or scope of the inventions.

In addition, the above-described methods can be implemented in a program recorded medium as processor-readable codes. The processor-readable media may include all kinds of recording devices in which data readable by a processor are stored. The processor-readable media may include ROM, RAM, CD-ROM, magnetic tapes, floppy discs, optical data storage devices, and the like for example and also include carrier-wave type implementations (e.g., transmission via Internet).

It will be appreciated by those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A mobile terminal comprising:
a touchscreen;
a wireless communication unit;
an audio output unit; and
a controller operably coupled to the touchscreen, the wireless communication unit, and the audio output unit, and configured to:
cause the audio output unit to output a counterpart audio received via the wireless communication unit from another terminal;
convert the counterpart audio to text;
extract first specific information from the text according to defined criteria in response to a touch input received at a specific timing point, the extracted first specific information being different based on a type of the touch input such that:
the first specific information is extracted from the counterpart audio received prior to the specific timing point if the touch input is a first type; and
the first specific information is extracted from the counterpart audio received after the specific timing point if the touch input is a second type; and
cause the touchscreen to display the extracted first specific information,
wherein the first type touch input and the second type touch input are different.

2. The mobile terminal of claim 1, wherein the first specific information is displayed automatically without requiring a user input when the communicating with the other terminal is finished.

3. The mobile terminal of claim 1, wherein the first specific information is displayed in response to a user input received after the communicating with the other terminal is finished.

4. The mobile terminal of claim 1, further comprising:
a microphone; and
a memory,
wherein the controller is further configured to:
convert an audio input via the microphone to text;
extract second specific information from the text converted from the audio input via the microphone; and
cause the memory to store the extracted first and second specific information.

5. The mobile terminal of claim 1, wherein the first specific information comprises at least:
first information associated with a person;
second information associated with a place; or
third information associated with time.

6. The mobile terminal of claim 5, wherein the controller is further configured to cause the touchscreen to display an object representing an application associable with the first specific information, the object determined according to a type of the first specific information.

7. The mobile terminal of claim 6, wherein the controller is further configured to execute the application using the first specific information in response to a touch input received at the displayed object.

8. The mobile terminal of claim 6, wherein the controller is further configured to cause the touchscreen to display different objects for at least two of the first, second, and third information that are of different types of the first specific information.

9. The mobile terminal of claim 1, wherein the touch input is received while communicating with the other terminal.

10. The mobile terminal of claim 1, wherein the touch input is received via a touch input unit which is located at a rear side of the mobile terminal, and the touchscreen is located at a front side of the mobile terminal that is opposite to the rear side.

11. The mobile terminal of claim 1, wherein the controller is further configured to cause the touchscreen to display the first specific information emphatically when the first specific information is associated with a task processed prior to the communicating with the other terminal.

12. The mobile terminal of claim 11, wherein:
the first specific information comprises a keyword previously input via an Internet browser prior to the communicating with the other terminal; and
the controller is further configured to cause the touchscreen to display the first specific information emphatically based on the keyword included in the extracted first specific information.

13. The mobile terminal of claim 11, wherein:
the first specific information indicates surrounding of a place searched on a map prior to the communicating with the other terminal; and
the controller is further configured to cause the touchscreen to display the first specific information emphatically based on the searched place indicated by the extracted first specific information.

14. The mobile terminal of claim 1, wherein the controller is further configured to cause the touchscreen to display at least a picture associated with the first specific information or an image created based on the first specific information.

15. The mobile terminal of claim 1, wherein the controller is further configured to cause the touchscreen to display the first specific information over a background image selected based on a weather or time when the first specific information was extracted such that the background image indicates the weather or time when the mobile terminal communicated with the other terminal.

16. The mobile terminal of claim 1, wherein the controller is further configured to cause the touchscreen to:
display an indicator indicating presence of the extracted first specific information at a status display area of the touchscreen; and
display the extracted first specific information in response to a touch at the status display area and dragging in a downward direction, the touch and dragging received via the touchscreen while the indicator is displayed.

17. The mobile terminal of claim 1, wherein the touch input is received while communicating with the other terminal such that the specific timing point is included in duration of the communication in which the counterpart audio is received.

18. A method of controlling a mobile terminal, the method comprising:
communicating with a counterpart terminal;
outputting a counterpart audio received from the counterpart terminal;
converting the counterpart audio to text;
extracting specific information from the text according to defined criteria in response to a touch input received at a specific timing point, the extracted specific information being different based on a type of the touch input such that:
the specific information is extracted from the counterpart audio received prior to the specific timing point if the touch input is a first type; and
the specific information is extracted from the counterpart audio received after the specific timing point if the touch input is a second type; and
displaying the extracted specific information,
wherein the first type touch input and the second type touch input are different.

19. The method of claim 18, wherein the specific information is displayed automatically without requiring a user input when the communicating with the counterpart terminal is finished.

20. The method of claim 18, wherein the specific information is displayed in response to a user input received after the communicating with the counterpart terminal is finished.

* * * * *